United States Patent
Otsubo (10) Patent No.: US 11,285,658 B2
(45) Date of Patent: Mar. 29, 2022

(54) MANUFACTURING METHOD FOR HIGH PRESSURE TANK

(71) Applicant: TOYOTA JIDOSHA KABUSHIKI KAISHA, Toyota (JP)

(72) Inventor: Hirokazu Otsubo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 16/585,087

(22) Filed: Sep. 27, 2019

(65) Prior Publication Data

US 2020/0139610 A1     May 7, 2020

(30) Foreign Application Priority Data

Nov. 2, 2018  (JP) .............................. JP2018-207031

(51) Int. Cl.
  *B29C 53/58*     (2006.01)
  *B29K 701/12*    (2006.01)
  *B29K 307/04*    (2006.01)
  *B29K 63/00*     (2006.01)
  *B29L 31/00*     (2006.01)

(52) U.S. Cl.
  CPC .......... *B29C 53/58* (2013.01); *B29K 2063/00* (2013.01); *B29K 2307/04* (2013.01); *B29K 2701/12* (2013.01); *B29L 2031/7172* (2013.01)

(58) Field of Classification Search
  CPC ............. B29L 2031/7172; B29C 53/58; B29C 53/605; F17C 1/06
  See application file for complete search history.

(56) References Cited

U.S. PATENT DOCUMENTS

2005/0260373 A1*  11/2005  DeLay ................ B29C 53/602
                                                     428/36.4
2017/0219165 A1    8/2017  Takemoto

FOREIGN PATENT DOCUMENTS

| JP | S6391233 A | 4/1988 | |
| WO | 2006076029 A2 | 7/2006 | |
| WO | WO-2010116529 A1 * | 10/2010 | ............... F17C 1/06 |
| WO | 2016020972 A1 | 2/2016 | |

OTHER PUBLICATIONS

Machine Translation of WO-2010116529-A1 (Year: 2010).*

* cited by examiner

*Primary Examiner* — Daniel McNally
(74) *Attorney, Agent, or Firm* — Dickinson Wright, PLLC (57) ABSTRACT

A manufacturing method for a high pressure tank, includes preparing a liner, and forming a helical layer by helical-winding fiber bundles around the liner, wherein a plurality of layers included in the helical layer include: base turnback layers formed by winding the fiber bundles while a base section of each of caps projecting outward of the liner is used as a winding turnback position where the fiber bundles are turned back in the axial direction; and distant turnback layers formed by winding the fiber bundles while a distant position distant from each base section is used as the winding turnback position, and in the distant turnback layers, the helical-winding is performed such that gaps are generated between adjacent fiber bundles of the fiber bundles.

2 Claims, 7 Drawing Sheets

MANUFACTURING METHOD FOR HIGH PRESSURE TANK

INCORPORATION BY REFERENCE

The disclosure of Japanese Patent Application No. 2018-207031 filed on Nov. 2, 2018 including the specification, drawings and abstract is incorporated herein by reference in its entirety.

BACKGROUND

1. Technical Field

The present disclosure relates to a manufacturing method for a high pressure tank.

2. Description of Related Art

Some liners included in high pressure tanks for storing fuel gas used for natural gas automobiles, fuel cell automobiles, and the like have reinforcing layers for reinforcing outer surfaces of the liners (see International Publication No. WO 2016/020972).

SUMMARY

WO 2016/020972 describes a high pressure tank including a hoop layer and a helical layer as a reinforcing layer. In such a high pressure tank, it is conceivable to reduce amount of fibers forming the reinforcing layer in order to reduce the weight of the high pressure tank. However, strain caused in the reinforcing layer due to swelling of the liners might be increased by reducing the amount of fibers. In order to solve such a problem, there has been a demand for a technology that can achieve both weight reduction of the high-pressure tank and reduction in increase of strain caused in the reinforcing layer due to reduction in amount of the fibers.

The present disclosure can be implemented according to the following aspects.

According to one aspect of the present disclosure, a manufacturing method for a high pressure tank is provided. The manufacturing method for a high pressure tank, includes: preparing a liner that forms a space configured to seal a gas in the space, the liner including a cylinder portion in a cylindrical shape and a pair of dome portions provided at both ends of the cylinder portion in an axial direction of the cylinder portion, caps being provided to the respective dome portions; and forming a helical layer by helical-winding fiber bundles on the liner, wherein a plurality of layers included in the helical layer include: base turnback layers formed by winding the fiber bundles while a base section of each of the caps projecting outward of the liner in the axial direction is used as a winding turnback position where the fiber bundles are turned back in the axial direction; and distant turnback layers formed by winding the fiber bundles while a distant position distant from each base section is used as the winding turnback position, and in the distant turnback layers, the helical-winding is performed such that gaps are generated between adjacent fiber bundles of the fiber bundles.

With the above aspect, the weight reduction of the high pressure tank can be accomplished. Further, strain caused in the reinforcing layer can be reduced as compared with a high pressure tank having a helical layer formed by only base turnback layers. Further, in the distant turnback layers, since gaps are formed between the fiber bundles, it is possible to reduce the weight of the high pressure tank, and it is possible to further reduce strain caused in the reinforcing layer as compared with the case having no gaps.

In the above-described aspect, the coverage with the distant turnback layers may be in the range of not less than 50% to not more than 80%. With such a configuration, it is possible to cope with both reduction in amount of the fibers and reduction in increase of strain caused in the reinforcing layer by reducing the amount of the fibers, without excessively reducing the strength.

The present disclosure is not limited to the manufacturing method for a high pressure tank, and can be applied to various modes of a high pressure tank manufactured by the above manufacturing method and of the above manufacturing apparatus for a high pressure tank, and the like for example. Further, the present disclosure is not limited to the above-described aspects, and it is needless to mention that the present disclosure may be carried out in various modes without departing from the scope of the present disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
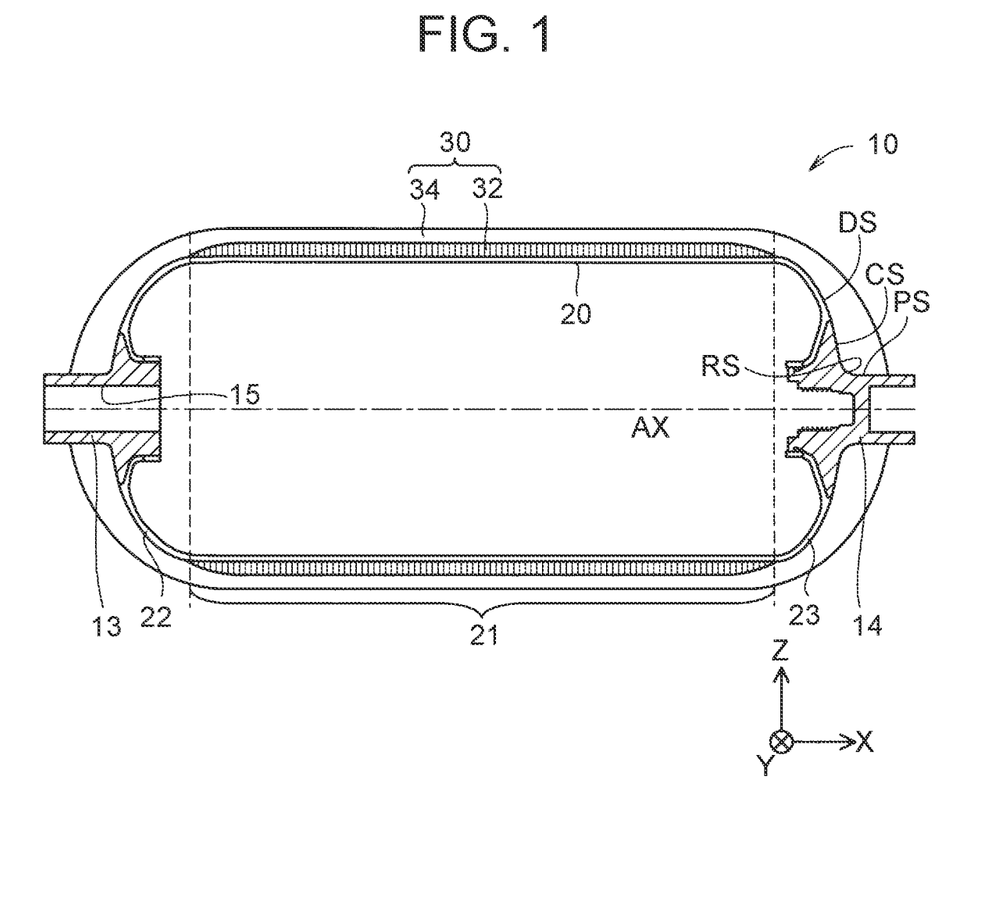
FIG. 1 is a sectional view showing a schematic structure of a high pressure tank.

FIG. 1 is a sectional view showing a schematic configuration of a high pressure tank 10 manufactured by the manufacturing method of the first embodiment. FIG. 1 shows XYZ axes orthogonal to one another. The XYZ axes in FIG. 1 correspond to XYZ axes in the other drawings. In the high pressure tank 10 of the present embodiment, for example, a high pressure hydrogen gas of about 70 MPa is stored. The high pressure tank 10 includes a liner 20 and a reinforcing layer 30.

The liner 20 is a hollow liner made of resin and forms a space for sealing a gas thereinside. The liner 20 is formed of, for example, a thermoplastic resin such as polyethylene, nylon, polypropylene, and polyester. A central axis of the liner 20 is common to a central axis AX of the high pressure tank 10. Hereinafter, a direction along the central axis AX may be referred to as a central axis AX direction. The liner 20 includes a cylinder portion 21, dome portions 22, 23, and caps 13, 14.

The cylinder portion 21 has a cylindrical shape. The dome portions 22, 23 are provided in pair at both ends of the cylinder portion 21 in the axial direction of the cylinder portion 21, and are each formed in a curved surface shape that is convex toward the outside of the liner 20. At the tops of the dome portions 22, 23, caps 13, 14 made of metal such as aluminum and stainless steel are provided, respectively. The cap 13 on one side has a through hole 15 and is used for charging the high pressure tank 10 with the gas or discharging the gas from the inside of the high pressure tank 10. The cap 14 on the other side is used for rotating the liner during reinforcing the liner 20 or forming the reinforcing layer of the liner 20.

The reinforcing layer 30 are layers covering the outer circumference of the liner 20 and serving for reinforcing the liner 20. The reinforcing layer 30 include a hoop layer 32 and a helical layer 34.

The hoop layer 32 is configured by hoop-winding fiber bundles around the cylinder portion 21. The fiber bundles used for the hoop-winding are configured by impregnating fiber bundles made of carbon fibers with a thermosetting resin such as an epoxy resin.

The helical layer 34 is configured by helical-winding fiber bundles on the hoop layer 32 and the dome portions 22, 23. The fiber bundles used for helical-winding are configured by impregnating fiber bundles made of carbon fibers with a thermosetting resin such as epoxy resin, as with the fiber bundles used for the hoop-winding.

The thickness of the hoop layer 32 and the thickness of the helical layer 34 are appropriately set according to a pressure resistance and a strength required for the high pressure tank 10, respectively.

Figure 2:
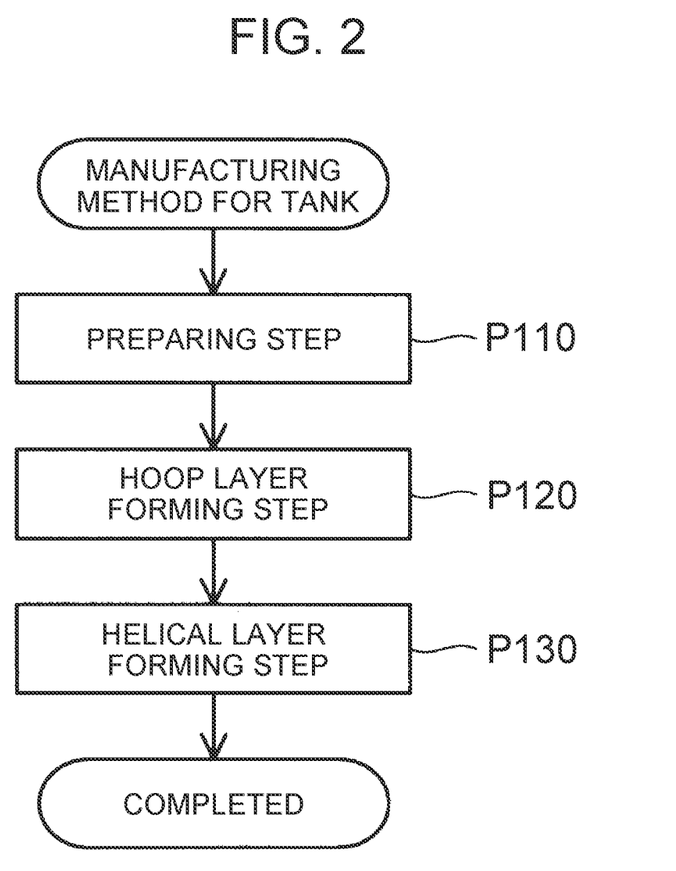
FIG. 2 is a process diagram showing a manufacturing method for the high pressure tank.

FIG. 2 is a process diagram showing the manufacturing method for the high pressure tank 10. In the manufacturing method of the present embodiment, first, a preparing step of preparing the liner 20 is performed (step P110). The caps 13, 14 are provided at the respective tops of the dome portions 22, 23 of the liner 20 prepared at this time After the preparing step (step P110), a hoop layer forming step is performed such that the hoop layer 32 is formed by hoop-winding the fiber bundles around the cylinder portion 21 (step P120).

After the hoop layer forming step (step P120), a helical layer forming step is performed such that the helical layer 34 is formed by helical-winding the fiber bundles on the hoop layer 32 and the dome portions 22, 23 (step P130). After the helical layer forming step (step P130), the high pressure tank 10 is completed (shown in FIG. 1). The reinforcing layer may be formed in a reverse order of the hoop layer forming step (step P120) and the helical layer forming step (step P130). In this case, the hoop layer 32 is formed on the helical layer 34 having been formed on the cylinder portion 21.

Figure 3:
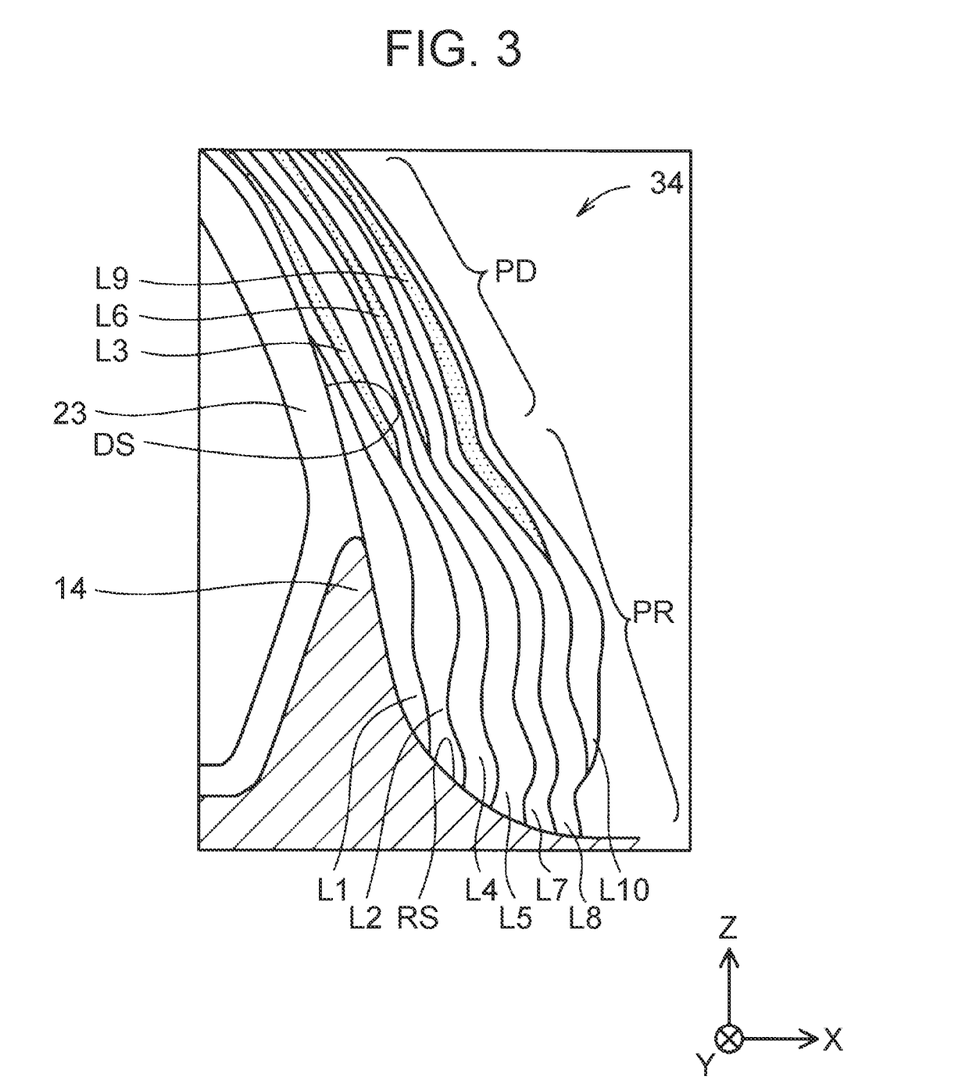
FIG. 3 is an enlarged view showing the vicinity of a cap.

FIG. 3 is an enlarged view of the vicinity of the cap 14. The helical layer 34 includes a plurality of layers L1 to L10. A reference numeral x in a layer Lx (x is any integer from 1 to 10) indicates an x-th layer formed from the dome portion 23 side in the helical layer 34. The layer L1 is a layer formed by helical-winding the fiber bundles on the outer circumferential surface of the liner 20. The layer L2 is a layer formed by helical-winding the fiber bundles on the layer L1. The layer L1 and the layer L2 are formed by low-angle helical winding.

Figure 4:
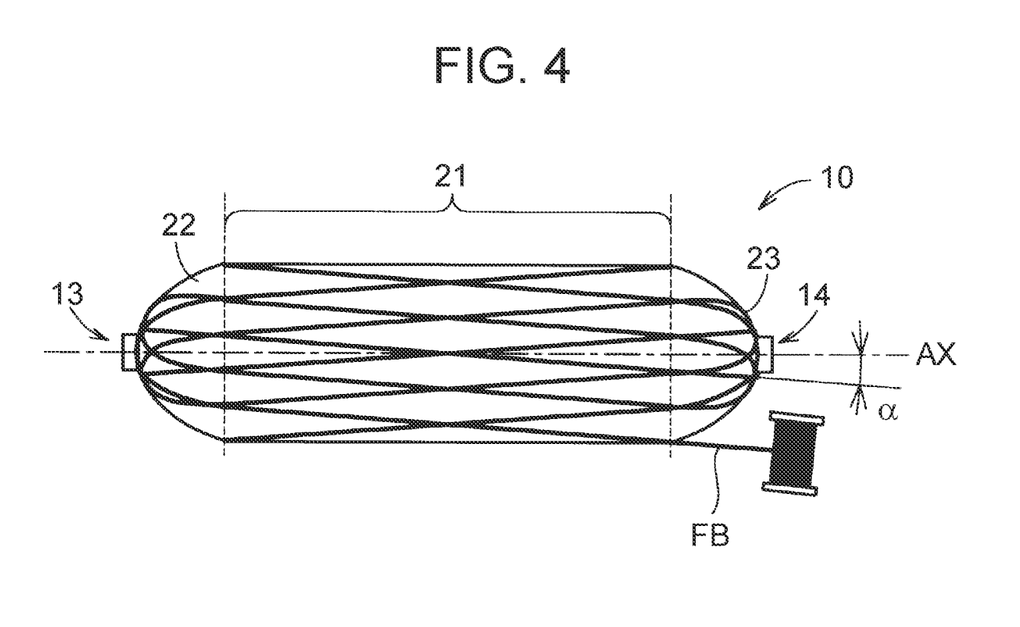
FIG. 4 is an explanatory view explaining low-angle helical winding.

FIG. 4 is an explanatory view for explaining the low-angle helical winding. FIG. 4 shows how the fiber bundles FB are wound around the liner 20 by the low-angle helical winding. The "low-angle helical winding" is a winding method having a relatively small winding angle α, in which the fiber bundle FB is turned back in the central axis AX direction in the winding of the fiber bundles FB before the fiber bundles FB are wound around the central axis AX in the cylinder portion 21 by one round. In the present embodiment, the winding angle α is 30 degrees. In the low-angle helical winding, winding turnback positions at which the fiber bundles FB are turned back in the central axis AX direction correspond to base sections RS (shown in FIG. 1) that connect curved surface portions CS configured to be continuous to the dome portions 22, 23 of the caps 13, 14 and respective projecting portions PS of the caps 13, 14 that project outward of the high pressure tank 10 along the central axis AX direction. In other words, the winding turnback positions in the low-angle helical winding are the base sections RS of the caps 13, 14 of the liner 20 projecting outward of the liner 20 along the central axis AX direction.

The layer L3 is a layer formed by helical-winding the fiber bundles on the layer L2. The layer L3 is formed by high-angle helical winding.

Figure 5:
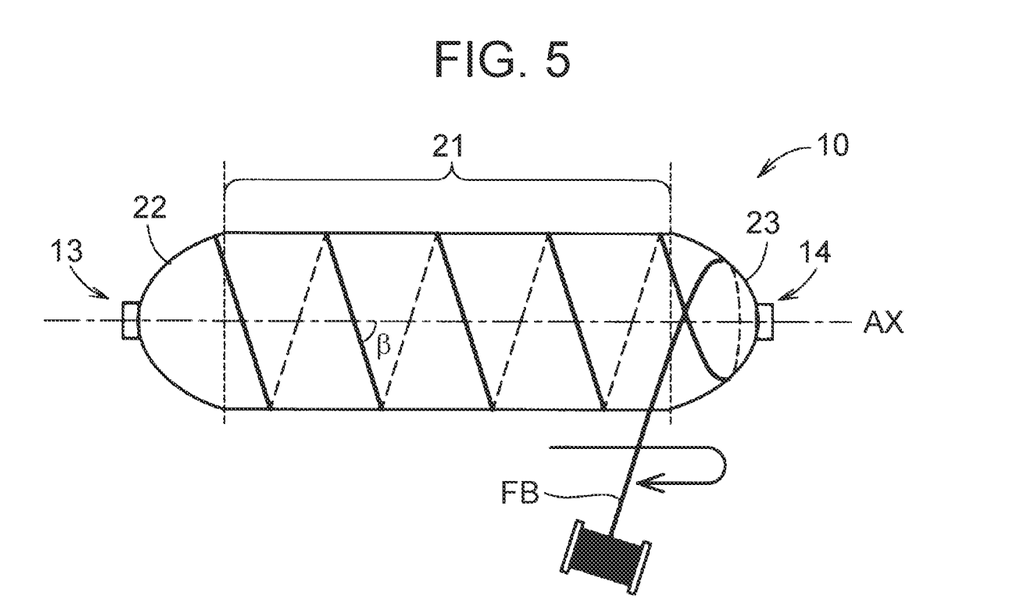
FIG. 5 is an explanatory view explaining high-angle helical winding.

FIG. 5 is an explanatory view for explaining the high-angle helical winding. FIG. 5 shows how the fiber bundles FB are wound around the liner 20 by the high-angle helical winding. The "high-angle helical winding" is a winding method having a relatively great winding angle β, in which the fiber bundles FB are turned back in the central axis AX direction in the winding of the fiber bundles FB after the fiber bundles FB are wound around the central axis AX by at least one round in the cylinder portion 21. In the present embodiment, the winding angle β is 60 degrees. It can be said that "high-angle helical winding" is a winding method in which the fiber bundles FB are not turned back in the central axis AX direction in the winding of the fiber bundles FB before the fiber bundles FB are wound around the central axis AX by one round in the cylinder portion 21. In the high-angle helical winding, the winding turnback positions at which the fiber bundles FB are turned back in the central axis AX direction correspond to distant positions DS distant from the projecting portions PS of the caps 13, 14 of the dome portions 22, 23 (shown in FIG. 1). In other words, the winding turnback positions of the "high-angle helical winding" are the distant position DS distant from the base sections RS that is the winding turnback positions of the "low-angle helical winding" in the Z-axis direction. In FIG. 1, the distant position DS is provided on the curved surface of the dome portion 23, but may be on a curved surface portion CS of the cap 14.

The layer L4, the layer L5, the layer L7, the layer L8, and the layer L10 are formed by the low-angle helical winding, as with the layer L1 and the layer L2. The layer L6 and the layer L9 are formed by the high-angle helical winding, as with the layer L3. In the present embodiment, the layers formed by the low-angle helical winding correspond to base turnback layers. In the present embodiment, the layers formed by the high-angle helical winding correspond to distant turnback layers.

Among the fiber bundles included in the layer L3, the layer L6, and the layer L9, the helical winding is performed so as to generate a gap between adjacent fiber bundles of the fiber bundles in each layer. A coverage with the fiber bundles of the layer L3, the layer L6, and the layer L9 is 80%.

Figure 6:
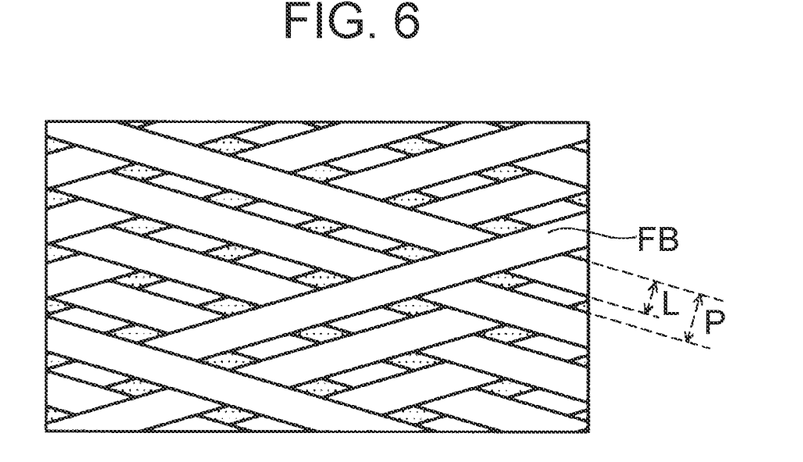
FIG. 6 is an enlarged view of a part of a liner covered with layers having a coverage of 80%.

FIG. 6 is an enlarged view of a part of the liner 20 covered with layers having a coverage of 80%. Hatched portions in FIG. 6 indicate surface portions of the liner 20, which are not covered with the fiber bundles FB.

Figure 7:
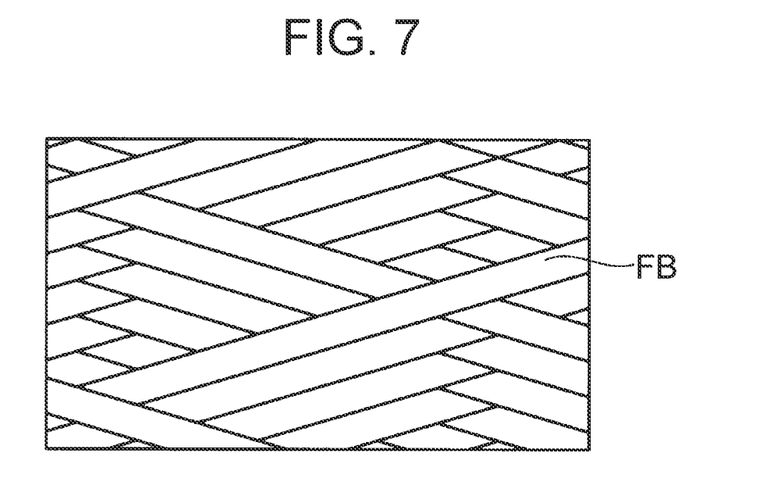
FIG. 7 is an enlarged view of a part of the liner covered with layers having a coverage of 100%.

FIG. 7 is an enlarged view of a part of the liner 20 covered with layers having a coverage of 100%. FIG. 7 shows a state in which the liner 20 cannot be seen because the liner 20 is covered with the fiber bundles FB over the entire surface.

How the coverage in the formation of the helical layer 34 is adjusted will be described with reference to FIG. 6. In FIG. 6, in two adjacent fiber bundles of interest, if a distance from one end in the width direction of one fiber bundle and one end in the width direction of the other fiber bundle is defined as a pitch P, the coverage is defined as a percentage of a distance L from one end to the other end in the width direction of the one fiber bundle relative to the pitch.

Figure 8:
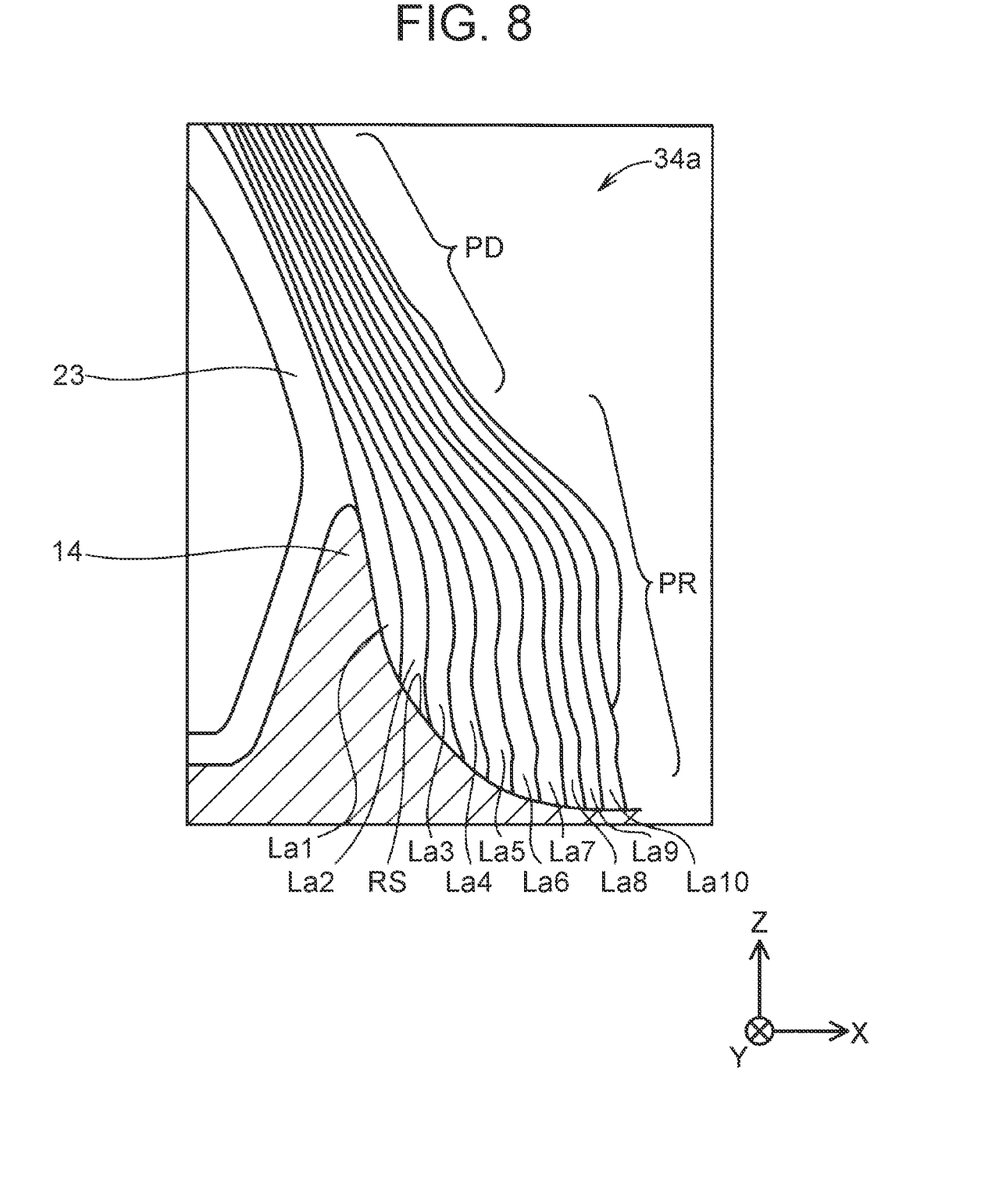
FIG. 8 is an enlarged view of the vicinity of the cap.

FIG. 8 is an enlarged view of the vicinity of the cap 14 of a high pressure tank 10a manufactured by a manufacturing method of Comparative Example 1. The configuration of the high pressure tank 10a of Comparative Example 1 is the same as the high pressure tank 10 manufactured by the manufacturing method of the first embodiment, except that the high pressure tank 10a has a helical layer 34a different from the helical layer 34.

The helical layer 34a includes a plurality of layers La1 to La10. A reference numeral y of a layer Lay (y is any integer from 1 to 10) indicates a y-th layer formed from the dome portion 23 side, in the helical layer 34a. The layers La1 to La10 are formed by low-angle helical winding. A coverage with the layer La1 to La10 is 100%.

In the case of the low-angle helical winding, the winding turnback positions of the fiber bundles are at the base sections RS, so that the winding of the fiber bundles is concentrated on the vicinity of the base sections RS. Therefore, local swelling occurs in portions PR of the helical layer 34a, which are formed on the base sections RS. In such a high pressure tank 10a, it has been confirmed that a strain of 2.17% occurs in the reinforcing layer 30 when the tank is charged with the gas with an amount enough for the liner 20 to have an internal pressure of 180 MPa. The strain referred to herein denotes any displacement, expansion, contraction, torsion, linear strain or surface strain, or any other deformation in a part of the reinforcing layer. If a state in which no strain is caused in the reinforcing layer 30 is defined as 0%, of strains caused due to increase in internal pressure of the liner 20 from this state, a strain in a part where a maximum strain is caused is defined as a measurement value. In addition, the strains caused in the reinforcing layer are found by calculations based on a simulation by CAE.

Figure 9:
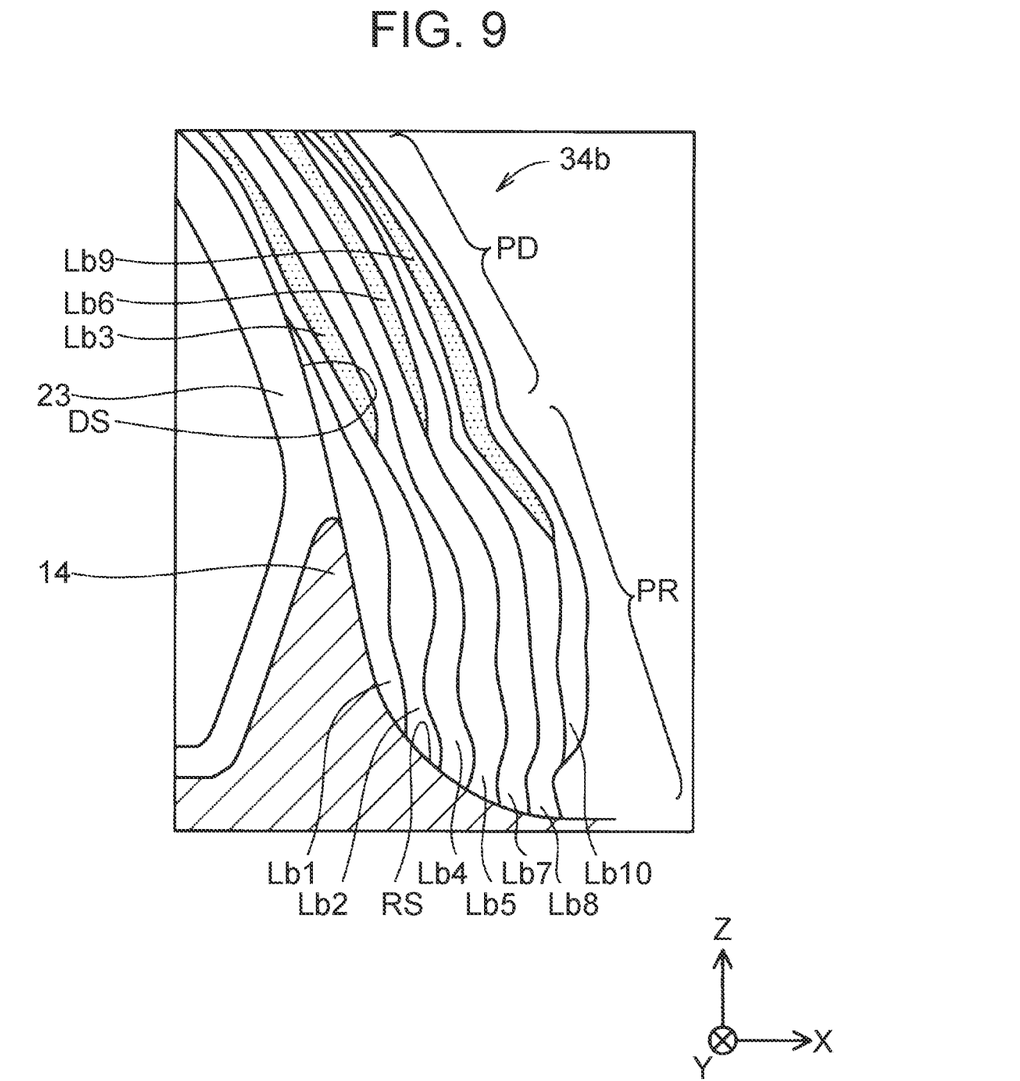
FIG. 9 is an enlarged view of the vicinity of the cap.

FIG. 9 is an enlarged view of the vicinity of the cap 14 in a high pressure tank 10b manufactured by a manufacturing method of Comparative Example 2. The configuration of the high pressure tank 10b of Comparative Example 2 is the same as that of the high pressure tank 10 manufactured by the manufacturing method of the first embodiment, except that the high pressure tank 10b has a helical layer 34b different from the helical layer 34.

The helical layer 34b includes a plurality of layers Lb1 to Lb10. A reference numeral z of a layer Lbz (z is any integer from 1 to 10) indicates a z-th layer formed from the dome portion 23 side, in the helical layers 34b. The layers Lb1, Lb2, Lb4, Lb5, Lb7, Lb8, Lb10 are formed by the low-angle helical winding. The layers Lb3, Lb6, Lb9 are formed by the high-angle helical winding. The helical layer 34 of the first embodiment and the helical layer 34b of the comparative example 2 have the same configurations that the first, second, fourth, fifth, seventh, eighth, and tenth layers formed from the dome portion 23 side are formed by the low-angle helical winding, and the third, sixth, and ninth layers formed from the dome portion 23 side are formed by the high-angle helical winding. A difference between the helical layer 34 of the first embodiment and the helical layer 34b of Comparative Example 2 is in that, in Comparative Example 2, the coverage with the layers formed by the high-angle helical winding is 100%.

In the high pressure tank 10b manufactured by the manufacturing method of Comparative Example 2, concentration of the winding of the fiber bundles on the vicinities of the base sections RS is suppressed more greatly as compared with the high pressure tank 10a manufactured by the manufacturing method of Comparative Example 1; therefore, local swelling hardly occurs in the portion PR formed on each base section RS of the helical layer 34b. It is considered that this is because the layers Lb3, Lb6, Lb9 are formed by the high-angle helical winding. However, in the high-angle helical winding, since the winding turnback positions of the fiber bundles are at the distant positions DS distant from the projecting portions PS of the caps 13, 14 of the dome portions 22, 23, the winding of the fiber bundles is concentrated on the vicinity of the distant positions DS. Therefore, in the high pressure tank 10b manufactured by the manufacturing method of Comparative Example 2, local swelling, which is smaller than the portion PR, occurs in the portion PD of the helical layer 34b formed on each distant position DS. In such a high pressure tank 10b, it has been confirmed that when the tank is charged with the gas with an amount enough for the liner 20 to have an internal pressure of 180 MPa, a strain of 1.68% occurs in the reinforcing layer 30.

On the other hand, in the high pressure tank 10 manufactured by the manufacturing method of the first embodiment, the layers L1, L2, L4, L5, L7, L8, L10 are formed by the low-angle helical winding. The layers L3, L6, L9 are formed by the high-angle helical winding. In addition, the coverage with the layers L3, L6, L9 formed by the high-angle helical winding is 80%.

Compared to the high pressure tank 10a manufactured by the manufacturing method of Comparative Example 1 having the helical layer 34a including the layers formed by the low-angle helical winding, in the high pressure tank 10 manufactured by the manufacturing method of the first embodiment, concentration of the winding of the fiber bundles on the vicinity of the base sections RS is suppressed. Hence, local swelling is unlikely to occur in the portion PR of the helical layer 34, which is formed on each base section RS. Moreover, compared with the high pressure tank 10b manufactured by the manufacturing method of Comparative example 2 having a coverage with the layers formed by the high-angle helical winding of 100%, in the high pressure tank 10 manufactured by the manufacturing method of the first embodiment, the coverage with the layers formed by the high-angle helical winding is 80%. Hence, even in the portion PD of the helical layer 34 formed on each distant position DS, local swelling hardly occurs. In such a high pressure tank 10, it has been confirmed that a strain of 1.58% occurs in the reinforcing layer 30 when the tank is charged with the gas with an amount enough for the liner 20 to have an internal pressure of 180 MPa.

In the high pressure tank 10, the layers formed by the high-angle helical winding are included in the helical layer 34, to thereby suppress local swelling in the portion PR, which occurs in the high pressure tank 10a of Comparative Example 1. Further, in the high pressure tank 10, the coverage with the layers formed by the high-angle helical winding is set to be 80%, to thereby suppress local swelling in the portions PD, which occurs in the high pressure tank 10b of Comparative Example 2. In other words, in the high pressure tank 10, since the shape of the helical layer 34 is formed in a smooth shape by suppressing occurrence of local swelling, it is possible to suppress occurrence of bending in the fiber bundles included in the helical layer 34, and reduce a difference in rigidity among the plurality of layers included in the helical layer 34. Accordingly, it is possible to reduce strain generated in the reinforcing layer 30.

According to the above-described embodiment, weight reduction of the high pressure tank 10 can be accomplished. Moreover, compared with the high pressure tank 10*a* manufactured by the manufacturing method of Comparative Example 1, strain is more greatly suppressed from being caused in the reinforcing layer. Further, as compared with the high pressure tank 10*b* manufactured by the manufacturing method of Comparative Example 2, since the coverage is smaller and gaps are formed between the fiber bundles, it is possible to attain weight reduction of the high pressure tank 10. Further, strain caused in the reinforcing layer 30 can be further reduced as compared with the high pressure tank 10*b* including the helical layer 34*a* with no gaps, which is manufactured by the manufacturing method of Comparative Example 2.

Further, in the high pressure tank 10, since the coverage with the layers formed by the high-angle helical winding is 80%, it is possible to cope with both reduction in amount of the fibers and reduction in increase of strain caused in the reinforcing layer due to the reduction in amount of the fibers without excessively deteriorating the strength.

B. Other Embodiments

In the above-described embodiments, the coverage with the layers formed by the high-angle helical winding is 80%, but the present disclosure is not limited to this. By reducing the coverage to less than 80%, it is possible to further attain weight reduction of the high pressure tank 10 and strain reduction in the reinforcing layer. If the coverage rate is excessively reduced, sufficient strength may not be obtained in the reinforcing layer 30 that reinforces the liner 20. Taking these points into consideration, the coverage with the layers formed by the high-angle helical winding may be set to any value selected from a range of not less than 50% to not more than 80% as far as reinforcement of the liner 20 and reduction in strain caused in the reinforcing layer 30 can be compatible.

In the above-described embodiment, 30% of the plurality of layers included in the helical layer 34 is formed by the high-angle helical winding, but the present disclosure is not limited to this. The ratio of the layers formed by the high-angle helical winding to the plurality of layers included in the helical layer 34 may be appropriately selected as far as reinforcement of the liner 20 and reduction in strain caused in the reinforcing layer 30 can be compatible.

The present disclosure is not limited to the above-described embodiments, examples, and modifications, and can be implemented with various configurations without departing from the scope of the disclosure. For example, the technical features in the embodiments, examples, and modifications corresponding to the technical features in the respective aspects described in the section of Summary can be replaced or combined as appropriate for the purpose of solving some or all of the problems described above, or of achieving part or all of the above-mentioned effects. Also, if the technical features are not described as essential ones in the present specification, they can be deleted as appropriate.

What is claimed is:

1. A manufacturing method for a high pressure tank, comprising:
   preparing a liner that forms a space configured to seal a gas in the space, the liner including a cylinder portion in a cylindrical shape and a pair of dome portions provided at both ends of the cylinder portion in an axial direction of the cylinder portion, caps being provided to the respective dome portions; and
   forming a helical layer by helical-winding fiber bundles on the liner,
   wherein
   a plurality of layers included in the helical layer include:
     base turnback layers formed by winding the fiber bundles while a base section of each of the caps projecting outward of the liner in the axial direction is used as a winding turnback position where the fiber bundles are turned back in the axial direction; and
     distant turnback layers formed by winding the fiber bundles while a distant position distant from each base section is used as the winding turnback position, and
   in the distant turnback layers, the helical-winding is performed such that gaps are generated between adjacent fiber bundles of the fiber bundles;
   wherein at least one distant turnback layer is formed between two base turnback layers, and at least one base turnback layer is formed between two distant turnback layers.

2. The manufacturing method for a high pressure tank according to claim 1, wherein a coverage with the fiber bundles of the distant turnback layers is in a range of not less than 50% to not more than 80%.

* * * * *